United States Patent [19]

Yasukawa et al.

[11] Patent Number: 4,876,948
[45] Date of Patent: Oct. 31, 1989

[54] CONSTANT SPEED HOLDING DEVICE FOR VEHICLE

[75] Inventors: Takeshi Yasukawa; Masayoshi Onishi; Tadayuki Fujimoto, all of Hyogo, Japan

[73] Assignee: Mitsubishi Denki Kabushiki Kaisha, Tokyo, Japan

[21] Appl. No.: 184,554

[22] PCT Filed: Aug. 10, 1987

[86] PCT No.: PCT/JP87/00596
§ 371 Date: May 20, 1988
§ 102(e) Date: May 20, 1988

[87] PCT Pub. No.: WO88/01239
PCT Pub. Date: Feb. 25, 1988

[30] Foreign Application Priority Data

Aug. 19, 1986 [JP] Japan ................... 61-126148
Aug. 19, 1986 [JP] Japan ................... 61-126149

[51] Int. Cl.⁴ .................. F01B 19/02; F16B 7/10

[52] U.S. Cl. .................. 92/99; 92/137; 403/50; 403/150; 403/163; 403/168; 403/354; 180/177; 74/502.6

[58] Field of Search ........ 92/99, 137; 403/50, 403/51, 99, 150, 151, 152, 161, 162, 163, 167, 168, 306, 324, 353, 354, 375, 398; 180/177; 74/502.6

[56] References Cited

U.S. PATENT DOCUMENTS

| 2,460,216 | 1/1949 | Dalton | 403/152 X |
| 2,628,855 | 2/1953 | Cushman | 403/152 |
| 4,567,814 | 2/1986 | Eldridge | 403/375 X |
| 4,704,044 | 11/1987 | Yoshigai | 403/150 X |

Primary Examiner—Robert E. Garrett
Assistant Examiner—Mark A. Williamson
Attorney, Agent, or Firm—Sughrue, Mion, Zinn, Macpeak and Seas

[57] ABSTRACT

A wire mounting structure for a vehicle cruise control has an upper plate 20a of a connector 20 formed with a through-hole 21a and a notch 22, and a lower plate 20b formed with an enlarged hole 21b for receiving the lower end of a rod 6b.

3 Claims, 5 Drawing Sheets

4,876,948

CONSTANT SPEED HOLDING DEVICE FOR VEHICLE

FIELD OF TECHNOLOGY

The present invention relates to a constant speed holding device for a vehicle and, particularly, to a mounting structure of a wiring device for operatively connecting an actuator constituting the constant speed holding device to a throttle link for actuating a throttle valve.

BACKGROUND ART

In a conventional constant speed holding or cruise control device of this type, a connecting structure for operatively connecting an actuator to a throttle link by means of a wiring device includes a rod mounted on an end of a wire and inserted into a through-hole formed in a metal connector which is formed by bending up a metal disc fixedly secured to a diaphram of the actuator.

That is, as shown in FIG. 1a, in the conventional connecting structure, the metal connector 2 has a rectangular upper plate 2a and a rectangular lower plate 2b which are parallel with and spaced from each other, and which are formed by bending out two tabs of a metal disc 1 fixedly secured to the diaphram of the actuator. The upper and lower plates 2a and 2b are formed with circular through-holes 3a and 3b having a common center axis, respectively. Therefore, the circular through-holes 3a and 3b formed in the upper and the lower plates 2a and 2b are positioned in complete coincidence with each other when viewed vertically.

A notch 4 is formed in the upper plate 2a which extends from a side edge of the plate to the through-hole 3a. The notch 4 is used as a guide groove for a wire to be described. On the other hand, the wire device 6 includes a wire 6a having one end mounting a circular rod 6b whose diameter is suitable to be inserted into the through-holes 3a and 3b. That is, the one end of the wire 6a is fixedly secured to substantially a center of the rod 6b such that the longitudinal axis of the rod 6b and the axis of the wire 6a are orthogonal, as shown in FIG. 1b, and thus the rod 6b and the wire 6a are mutually fixed to form a generally T shape.

In assembling the wire device 6 with the connector 2, the rod 6b is held above the upper plate 2a with the wire 6b being arranged along the notch 4 of the upper plate 2a and then inserted into the through-hole 3a of the upper plate 2a and into the through-hole 3b of the lower plate 2b while the wire 2 is allowed to pass through the notch 4. When the lower end of the rod 6b is inserted into the through-hole 3b and the upper end of the rod is positioned at the through-hole 3a of the upper plate 2a, the wire 6a together with the rod 6b is turned by 90° to a position shown by an imaginary line in FIG. 1a. Thus, the assembly of the wire 6a and the connector 2 is completed.

In such assembly operation there is no problem if the rod 6b is inserted along the center axis of the through-holes 3a and 3b thereinto. However, when the rod 6b is inserted into the through-hole 3a with an inclination with respect to the center axis, the lower end of the rod can not be inserted into the through-hole 3b of the lower plate 2b exactly, and an edge of the lower end of the rod rides on the periphery of the through-hole 3b. If the wire 6a is turned to make it orthogonal to the plane of the diaphram, the wire may drop off from the connector 2 when the actuator is operated, or the wire 6a may be broken by repeated operations.

The present invention was made to solve such problems, and an object thereof is to provide a reliable constant speed holding device for a vehicle, in which the assembly and disassembly of the wire device with respect to the connector are facilitated and the erroneous insertion of the rod mounted on the end of the wire is prevented.

SUMMARY OF THE INVENTION

The present invention is characterized by, in a device which controls a throttle valve by transmitting the movement of a diaphram through a throttle link, a connector fixedly secured to the diaphram of an actuator including spaced upper and lower plates, the upper plate being formed with a circular through-hole and a notch extending to the through-hole, the lower plate being formed with a hole for receiving a lower end of a rod, the latter hole being larger than the through-hole and including a projection area of the through-hole, the rod mounted on an end of a wire being inserted into the through-hole of the upper plate and then into the hole of the lower plate.

According to such constant speed holding device for a vehicle, the rod fixed on the end of the wire is inserted into the through-hole of the upper plate with the wire lying along the notch so that it can pass therethrough and, when the lower end of the rod is inserted into the hole of the lower plate, the wire is turned together with the rod so that the wire is positioned orthogonally to a surface of the diaphram. Thus, the assembling operation is facilitated.

DETAILED DESCRIPTION OF THE PREFERRED EMBODIMENTS

Figure 1A:
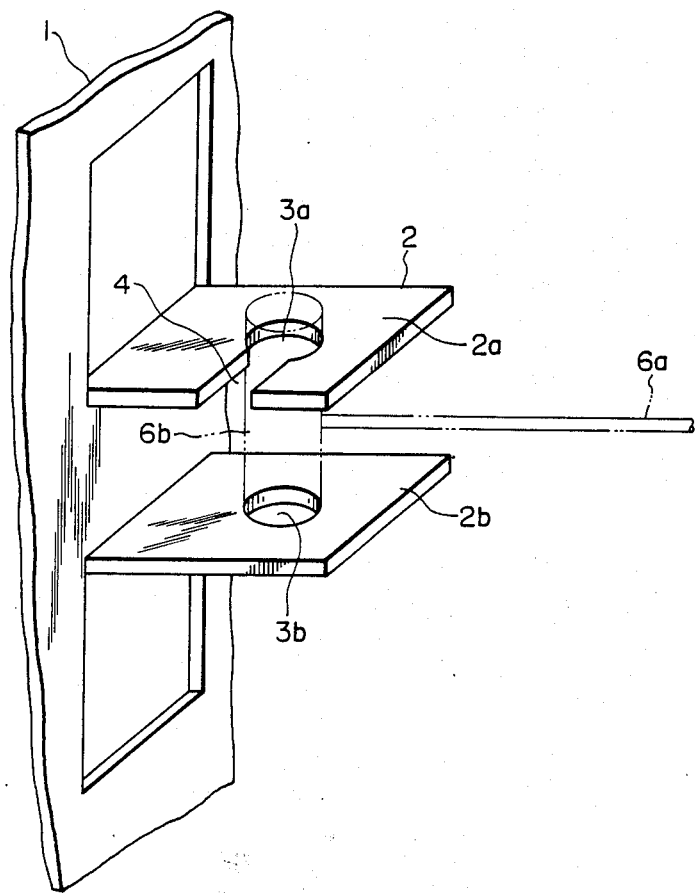
FIG. 1a is a perspective view of a connector mounted on an actuator in a conventional constant speed holding device.
Figure 1B:
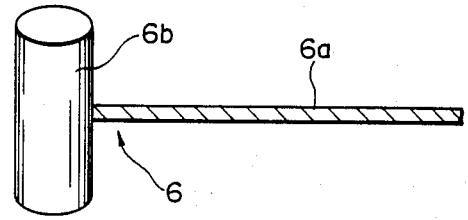
FIG. 1b is a perspective view of an end portion of a wire device on the connecting side thereof.
Figure 2:
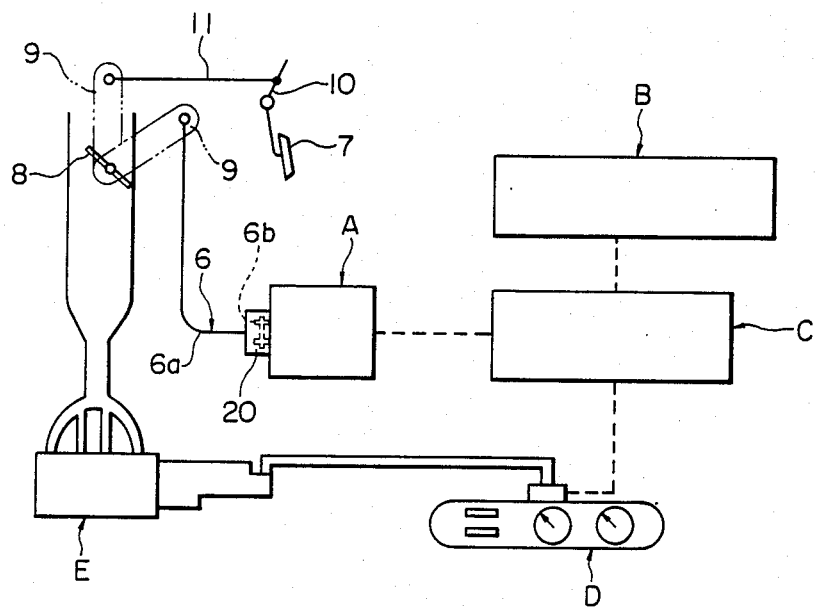
FIG. 2 shows a system construction of a constant speed holding device according to the present invention.

FIG. 2 shows a system construction including the constant speed holding device for a vehicle, in which A depicts an actuator, B a switch box, C a control unit, D a meter panel of the vehicle which includes a speedometer etc., E a vehicle engine, 7 an acceleration pedal, 8 a throttle valve and 9 a throttle link for opening and closing the throttle valve 8. An operation link 10 connected to the acceleration pedal 7 is connected to one end of a wire 11 whose the other end is connected to the throttle link 9. Therefore, the throttle valve 8 is opened and closed according to the depression of the acceleration pedal 7 to thereby increase and decrease the vehicle speed.

A wire 6a of the aforementioned wire device 6 is also connected to the throttle link 9 and the other end of the wire 6a is engaged with a connector 20 fixed on a diaphram 12 of the actuator A through a circular rod 6b fixed thereto.

Figure 3:
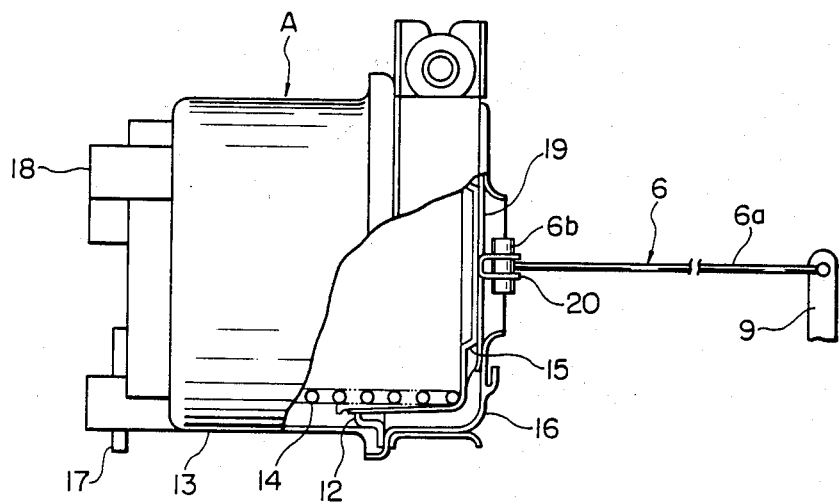
FIG. 3 is a partially cut away front view of an actuator of the constant speed holding device.
Figure 4:
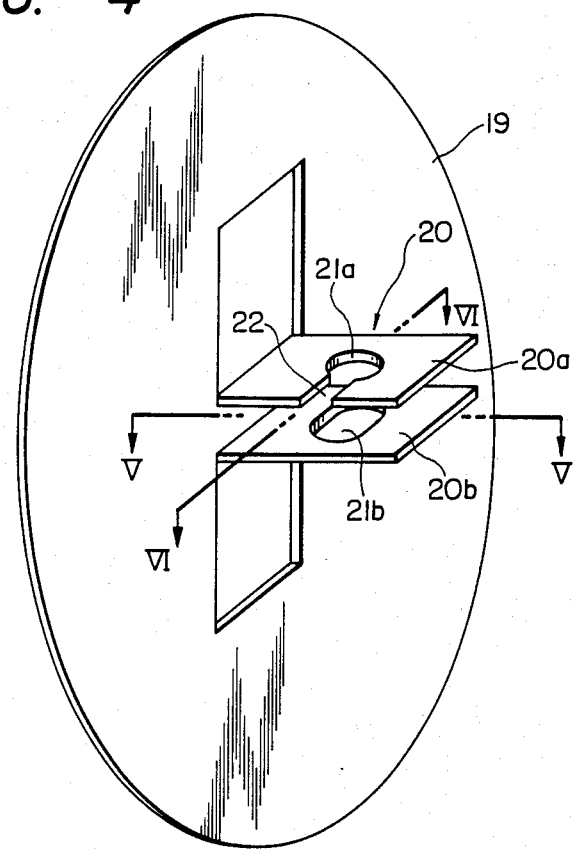
FIG. 4 is a perspective view of a connector of a constant speed holding device for a vehicle, according to an embodiment of the present invention.

FIG. 3 shows the actuator A partially. In FIG. 3, 13 depicts a housing of the actuator A, 14 a spring, 15 a diaphram holder, 16 a cover, 17 a vacuum port and 18 an atmospheric port. A circular metal disc 19 is fixedly secured to the diaphram 12 of the actuator A. The circular metal disc 19 is punched around the center of the diaphram 12 and the punched portions are bent out to form a pair of upper and lower metal plates 20a and 20b (FIG. 4) which constitute the connector 20.

Figure 5:
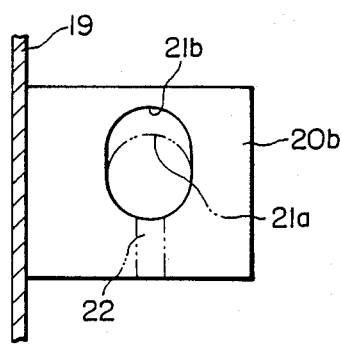
FIG. 5 is a cross section of the connector taken along line V—V in FIG. 4.

The upper plate 20a of the connector 20 is formed with a circular through-hole 21a having a diameter large enough to slidably receive the rod 6b of the wire device 6, and a notch or slot 22 extending from a periphery of the upper plate 20a to the through-hole 21a. On the other hand, the lower plate 20b is formed with an elongated hole 21b. The hole 21b is generally ellipsoidal and a minor radius thereof is substantially equal to the diameter of the through-hole 21a of the upper plate 20a. The position in which the long hole is formed is determined such that a major axis thereof is coincident with the longitudinal direction of the notch 22 of the upper plate 20a as shown in FIG. 5 and the end of the long hole 21b along the major axis on the side of the edge of the upper plate 20a in which the notch 22 is formed is in registration with the corresponding end of the through-hole 21a of the upper plate.

Figure 6:
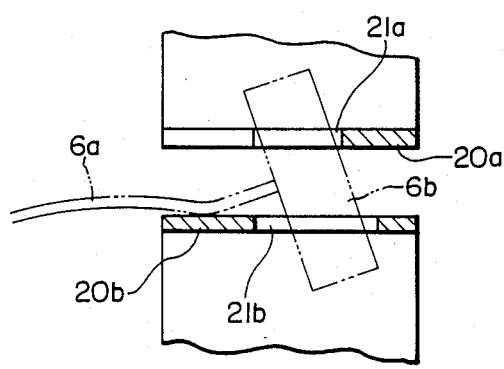
FIG. 6 is a cross section of the metal ware taken along line VI—VI in FIG. 4, FIGS. 7, 8 and 9 are cross sections of modifications of a hole formed in a lower plate for receiving a lower end of the rod, respectively.

The reason that the other end of the major axis of the long hole 21b extends over the through-hole 21a of the upper plate 20a laterally on the opposite side is that it is natural to mount the rod 6b of the wire device on the connector 20 by inserting the rod 6b into the through-hole 21a from the side of the notch 22 to allow the wire to pass through, and, in such case, the rod 6b may be inserted into the through-hole 21b with the lower end of the rod being inclined such that it protrudes on a side edge remote from the side edge in which the notch 22 is formed, as shown in FIG. 6. With the long hole 21b of the lower plate, the lower end of the rod 6b can be inserted into the long hole 21b without collision with the edge of the hole, with the result that an error in mounting the rod 6b to the connector 20 hardly occurs, facilitating the mounting operation.

The rod 6b of the wire device 6 is mounted on the connector 20 fixed to the diaphram 12 of the actuator A in this manner, and thus the diaphram 12 is connected operatively to the throttle link 9 through the connector 20. Thus, when a solenoid valve (not shown) connected to the atmospheric port 18 of the actuator A is closed and a solenoid valve (not shown) connected to the vacuum port 17 is opened, the diaphram 12 is sucked and moved against the force of the spring 14. As a result, the wire 6a is pulled by the connector 20 to rotate the throttle link 9.

On the other hand, when the vacuum port 17 is closed and the atmospheric port 18 is opened, the diaphram 12 is returned to an initial position by the spring 14, so that the throttle link 9 having a spring biasing returns to an initial position. In this manner, the opening of the throttle valve 8 is maintained at a desired value corresponding to the movement of the diaphram 12 of the actuator A, so that it is possible to run the vehicle at a constant speed.

The shape and position of the hole to be formed in the lower plate 20b of the connector 20 is not limited to those mentioned previously, and those shown in FIGS. 7 to 9 are also usable.

Figure 7:
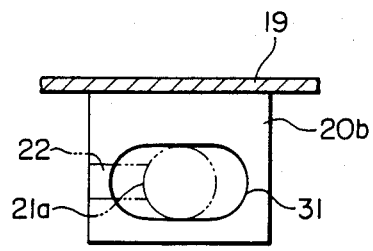
Figure 8:
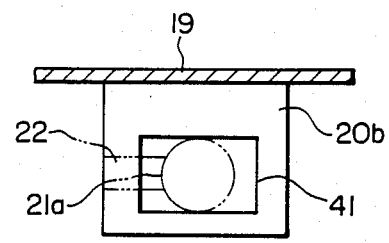
Figure 9:
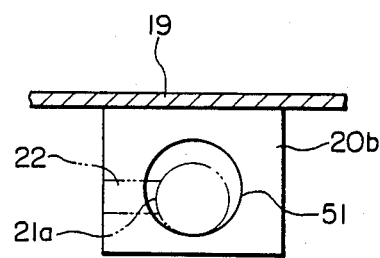

That is, FIGS. 7 to 9 are cross sections of the circular disc 19 when viewed from the side of the lower plate as in FIG. 5, respectively. In FIG. 7, a long hole 31 for receiving the lower end of the rod has a center common to the through-hole 21a of the upper plate so that opposite end portions of the long hole 31 on the major axis extend in opposite directions over the through-hole 21a.

In the embodiment in FIG. 8, a hole 41 formed in the lower plate 20b for receiving the lower end of the rod is rectangular with two sides thereof extending in the direction of the notch 22 circumscribing the through-hole 21a and the other two sides thereof orthogonal to the first two sides extending outside of the through-hole 21a.

In the embodiment shown in FIG. 9, the through-hole 21a is circular and inscribes a hole 51 having a diameter larger than that of the through-hole 21a and formed in the lower plate 20b for receiving the lower end of the rod at one side remote from the circular disc 19.

Figure 10:
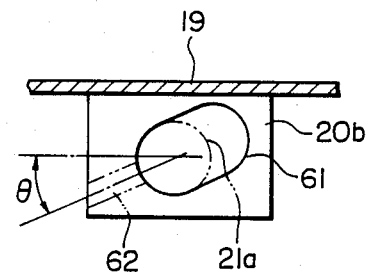
FIG. 10 is a cross section of another embodiment of the connector.

Further, in the embodiment shown in FIG. 10, a notch 62 formed in the upper plate extends along a line forming an angle of $\theta$ with a line parallel to the surface of the circular disc 19. The positional relation between the through-hole 21a of the upper plate and a hole 61 formed in the lower plate 20b for receiving the lower end of the rod is basically the same as that of the embodiment shown in FIG. 5. Therefore, the long hole 61 formed in the lower plate 20b for receiving the lower end of the rod is arranged such that the major axis thereof extends along the notch 62 and the through-hole 21a inscribes one end of the long hole 62.

The holes for receiving the lower end of the rod shown in FIGS. 7 to 9, respectively, make a smooth insertion of the lower end of the rod possible even if the rod is inserted while being inclined to prevent an erroneous insertion from occuring. The same effect can be obtained by the embodiment shown in FIG. 10.

Figure 11:
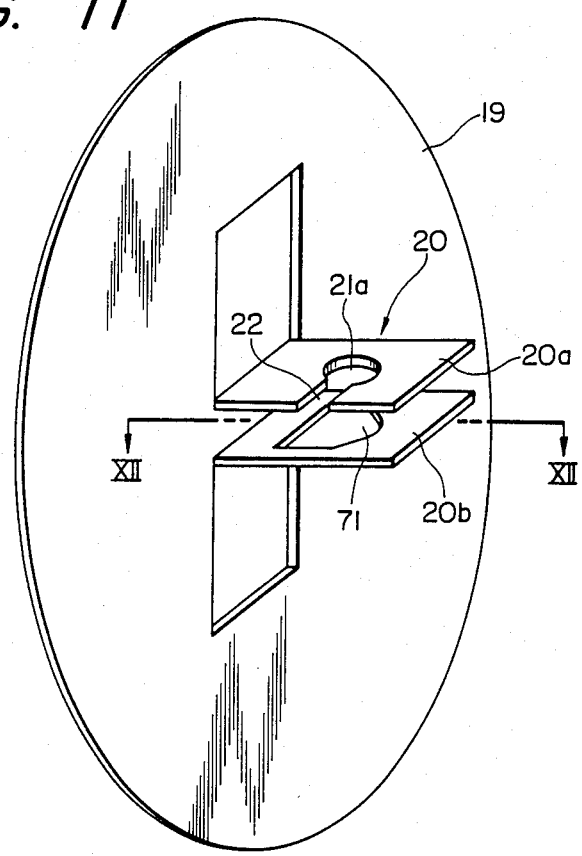
FIG. 11 is a perspective view of another embodiment of the connector.
Figure 12:
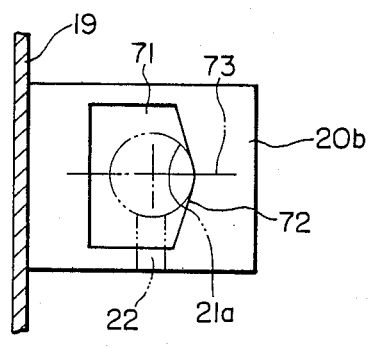
FIG. 12 is a cross section taken along line XII—XII in FIG. 11

FIGS. 11 and 12 show another embodiment of the present invention, in which a hole 71 is formed in the lower plate 20b for receiving the lower end of the rod, which is larger than the through-hole 21a and includes a projection area of the through-hole 21a. The hole 71 is a modified rectangular having one side 72 remote from the diaphram curved such that the through-hole 21a inscribes a curved portion of the side 72 at a point on a center line 73 of the hole 71 which is orthogonal to the diaphram surface.

With this construction, the hole 71 formed in the lower plate 20b of the connector can prevent an erroneous insertion of the rod similarly to the previous embodiments since it is larger than the through-hole 21a of the upper plate 20a. Further, since the side of the hole 71 (the side 72 remote from the diaphram 12) is curved such that it is registered partially with the periphery of the through-hole at the point on the center line 73 of the through-hole orthogonal to the diaphram 12, the upper and the lower ends of the rod 6b immediately contact with the peripheries of the through-hole 21a of the upper plate 20a and the hole 71 of the lower plate 20b when a pulling force is applied by the diaphram 12 to the wire 6a. Thus, it is possible to apply a stable pulling force to the wire 6a.

Figure 13:
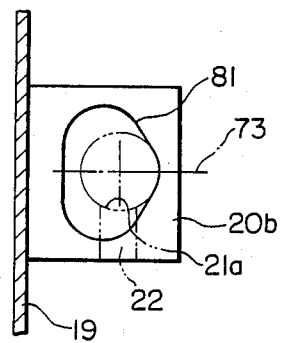
FIG. 13 is a cross section of another embodiment of the connector.

Although the hole 71 formed in the lower plate for receiving the lower end of the rod is a modified rectangle, the same effect can be obtained by a hole 81 having rounded corners as shown in FIG. 13.

We claim:

1. A cruise control device for a vehicle, including an actuator (A) having a diaphragm (12) and controlling a throttle valve (8) by transmitting movements of the diaphragm to a throttle link (9), comprising: a metal connector (19, 20) fixedly secured to the diaphragm and having an upper plate (20a) formed with an exclusively circular through-hole (21a) and a slot (22) extending from a side edge of said upper plate to said circular through-hole, and a lower plate (20b) disposed parallel to said upper plate and spaced therefrom, and formed with an aperture for receiving a lower end of a circular cylindrical rod (6b), said aperture being larger than said circular through-hole and including a projected area of said through-hole perpendicular to said lower plate, and a wire device (6) including a wire (6a) and said rod fixedly connected to one end of said wire, one end of said rod being inserted into said through-hole of said upper plate and another, opposite end of said rod being inserted into said aperture of said lower plate, with said wire passing through said slot during insertion, and the other end of said wire being connected to the throttle link.

2. The cruise control device as claimed in claim 1, wherein said aperture formed in said lower plate is an elongate aperture extending along a direction of said notch.

3. The cruise control device as claimed in claim 1, wherein a side (72) of said aperture formed in said lower plate and remote from said diaphragm is curved such that a curved portion thereof is in registry with a periphery of said through-hole at a point on a center line (73) of said through-hole orthogonal to said diaphragm.

* * * * *